C. REGER.
PULLEY.
APPLICATION FILED DEC. 7, 1911.
1,050,294.
Patented Jan. 14, 1913.
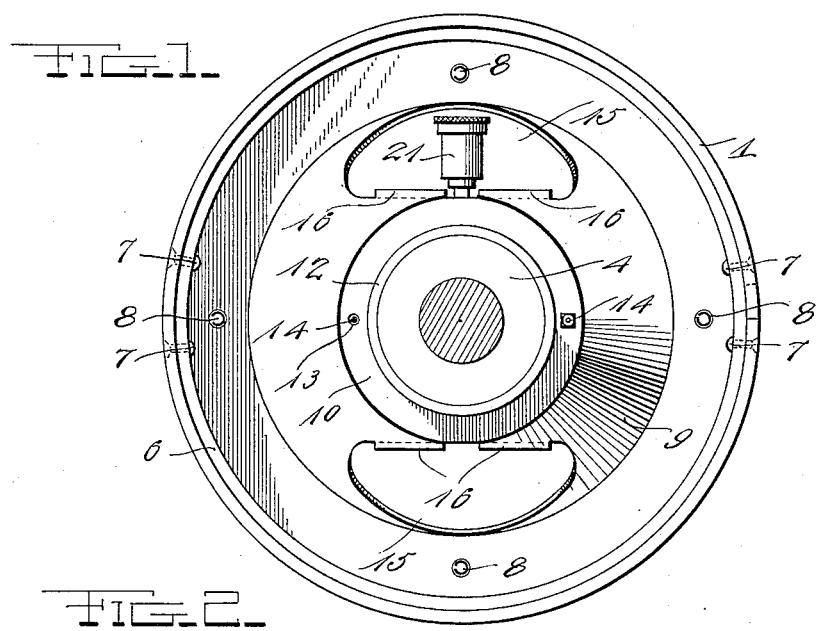
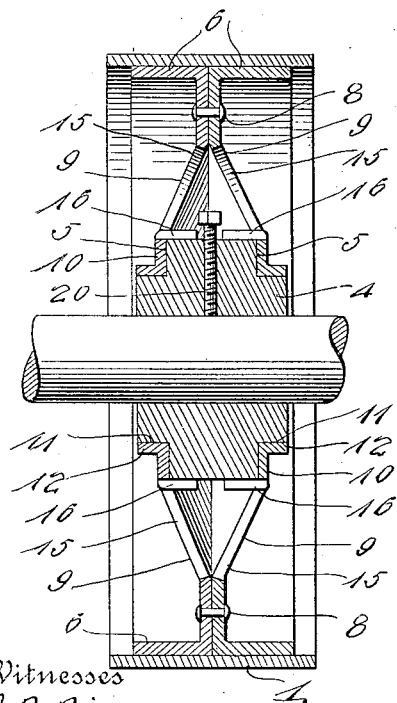
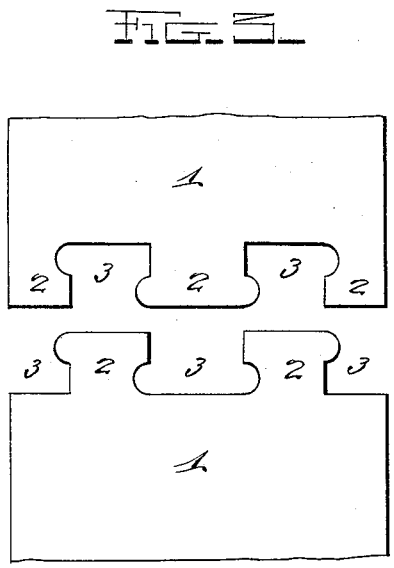
Witnesses
J. R. Pierce
N. L. Creamer
Inventor
Conrad Reger
by H. B. Willson & Co
Attorneys

UNITED STATES PATENT OFFICE.

CONRAD REGER, OF PHILADELPHIA, PENNSYLVANIA.

PULLEY.

1,050,294. Specification of Letters Patent. Patented Jan. 14, 1913.

Application filed December 7, 1911. Serial No. 664,352.

*To all whom it may concern:*

Be it known that I, CONRAD REGER, a subject of the German Emperor, residing at Philadelphia, in the county of Philadelphia and State of Pennsylvania, have invented certain new and useful Improvements in Pulleys; and I do declare the following to be a full, clear, and exact description of the invention, such as will enable others skilled in the art to which it appertains to make and use the same.

This invention is a pulley; and its object is to improve the construction of pulleys made entirely of metal. This object is accomplished by the means set forth in detail in the following specification and claim and shown in the drawings wherein—

Figure 1 is a side elevation of this pulley complete. Fig. 2 is a central vertical sectional view thereof. Fig. 3 is a plan view of the meeting ends of its rim.

The rim of this pulley is by preference made of a strip 1 of metal of the desired width, thickness and length; and the ends of said strip are formed with interengaging projections 2 and recesses 3, so that when the strip is bent around the pulley and its ends locked together they cannot pull apart. The hub of this pulley is by preference made of an iron casting 4 taking the shape of a bushing which may rotate upon a fixed axle or may be keyed or otherwise fastened to a rotating shaft, according to the uses to which the pulley is to be put. The bore of this hub is of the size desired, its circumference will be proportioned to the size of the entire pulley, and its length will probably be slightly less than the width of the rim 1. By preference the outer corner of each end of the hub is cut away in a right-angular notch 5 as shown.

The web of this improved pulley connecting its rim with its hub contains the principal features of my present invention. It is composed of two like members, each made from a disk of sheet metal originally flat and of a size somewhat larger than the finished pulley is to be, and by preference this disk is stamped into the shape described below at one operation of the dies. The edge of the disk is turned at right angles to its general plane into a flange 6 whose exterior circumference is such that it will fit closely within the rim 1, and the flanges of the two members or sides are riveted to said rim at the point 7 as shown; next inside these flanges said two members are riveted together as at 8 at various points around the web, and inside this circle of rivets the bodies of these two members begin to diverge as at 9. Farther inward toward the center of each disk, the divergence ceases and a flat ring 10 is formed, there being left a hole 11 through the ring with an outturned flange 12 around it for closely engaging the notch 5 in one end of the hub. At about two opposite points in the outer edge of said ring are formed perforations 13 through which may pass rivets or bolts 14 connecting the two sides or members with the interposed bushing 4. At two other diametrically opposite points preferably quartering to the perforations just described, large openings 15 are cut through the material of each side for sake of lightness, leaving tongues 16 along the inner sides thereof which are turned over on the periphery of the bushing 4 to hold the latter in place additionally to the rivets or bolts above described.

A set screw 20 may pass radially inward through a hole in the bushing with its tip bearing against the shaft upon which this pulley is secured, but it will be obvious that this set screw might be replaced by an oil cup 21 as is shown in Fig. 1. In any case, however, the large openings through the members or sides of this hub are useful for permitting the operator to gain access to the head of said screw or to said oil cup.

This improved pulley is by preference made entirely of metal, and of sheet metal throughout excepting for the hub or bushing which may well be of cast iron or other casting; and the sizes and proportions of parts are not essential to the present invention. I find by experience that it is extremely easy to make and to assemble, light and strong in use, and readily applied to or removed from the shaft if a set screw be passed through its hub or as easily lubricated if it be mounted upon a fixed journal so as to rotate, and the set screw be replaced by an oil- or grease-cup.

What is claimed as new is:

The herein described pulley comprising a tubular hub having a right-angular notch around its corner at each end, an annular rim, and a web connecting these members and made up of duplicate sheet-metal parts having outturned peripheral flanges secured within said rim, their bodies contacting next inside said flanges and being there riveted together, then diverging obliquely inward and provided with large openings disposed opposite each other in the two parts, integral tongues along the inner sides of said openings bent toward each onto the periphery of the hub, and said parts inside of the tongues being formed into flat rings with axially outturned flanges fitting the notches in the corners of the hub, and fastening bolts through said rings and the hub parallel with the bore of the latter.

In testimony whereof I have hereunto set my hand in presence of two subscribing witnesses.

CONRAD REGER.

Witnesses:
WILLIAM J. SMITH,
JAMES S. ASHWORTH.

Copies of this patent may be obtained for five cents each, by addressing the "Commissioner of Patents, Washington, D. C."